United States Patent

Spaulding et al.

[11] Patent Number: 5,975,671
[45] Date of Patent: *Nov. 2, 1999

[54] METHOD AND APPARATUS FOR PRINTING AN IMAGE ON A DEVICE HAVING MULTIPLE DOT DENSITIES AND MULTIPLE DOT AREAS

[75] Inventors: Kevin E. Spaulding, Spencerport; Douglas W. Couwenhoven; Rodney L. Miller, both of Fairport, all of N.Y.

[73] Assignee: Eastman Kodak Company, Rochester, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/657,723

[22] Filed: May 30, 1996

[51] Int. Cl.⁶ .................................................... B41J 2/205

[52] U.S. Cl. ........................ 347/15; 347/183; 400/120.07

[58] Field of Search ............................... 347/15, 172, 183, 347/195; 400/120.02, 120.07, 120.09, 120.15

[56] References Cited

U.S. PATENT DOCUMENTS

| | | | |
|---|---|---|---|
| 3,977,007 | 8/1976 | Berry et al. | 346/178 |
| 4,560,997 | 12/1985 | Sato et al. | 346/140 |
| 4,631,548 | 12/1986 | Milbrandt | 347/15 |
| 4,635,078 | 1/1987 | Sakurada | 347/15 |
| 4,959,659 | 9/1990 | Sasaki et al. | 346/1.1 |

*Primary Examiner*—John Hilten
*Attorney, Agent, or Firm*—Raymond L. Owens

[57] ABSTRACT

A method for processing a digitized continuous tone image so that such processed image is adapted to be applied to an image rendering device which prints dots from a set of two or more possible dot-areas and from a set of colorants having different colorant concentrations is disclosed. The method includes selecting a set of N dot-area and colorant concentration combinations, each of said combinations producing a different integrated optical density value and multilevel halftone processing the digitized continuous tone image to produce an output image having a set of output levels wherein one member of the set of N dot-area and colorant concentration combinations is associated with each of the possible output levels.

25 Claims, 3 Drawing Sheets

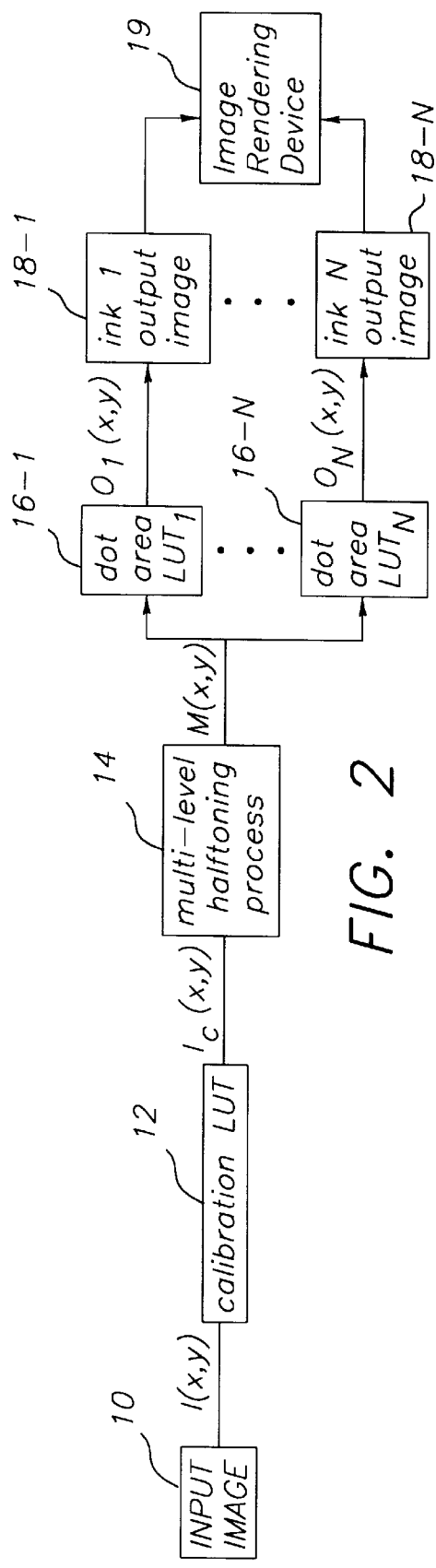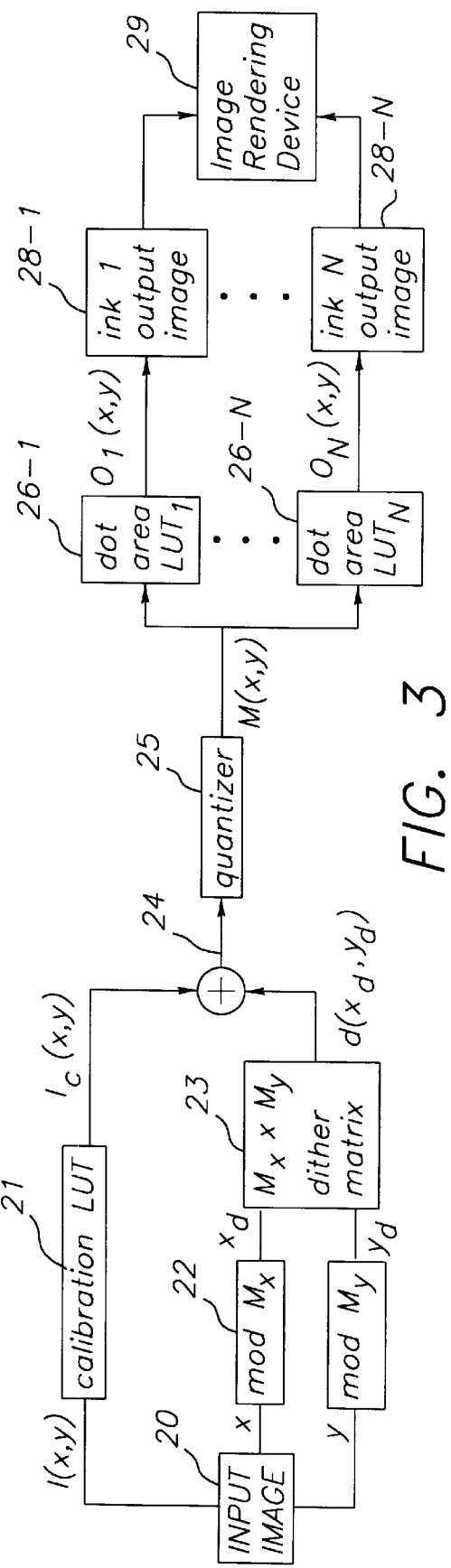

METHOD AND APPARATUS FOR PRINTING AN IMAGE ON A DEVICE HAVING MULTIPLE DOT DENSITIES AND MULTIPLE DOT AREAS

FIELD OF THE INVENTION

This invention pertains to digital imaging, and more particularly to the field of using printers which print dots from a set of one or more possible dot-areas and dot densities to provide different image densities.

BACKGROUND OF THE INVENTION

Digital printers are devices that are used to make hardcopy reproductions of digital images. There are many types of printers that are currently used. Ink jet printers are one common type of printer. With ink jet printers, drops of ink are deposited on a substrate after being ejected from an ink jet head. Typically, ink jet printers may print images with black ink, with cyan, magenta, and yellow (CMY) ink, or sometimes with cyan, magenta, yellow and black (CMYK) ink. For many commercially available printers, the drops of ink are deposited on the substrate on a rectangular grid at approximately 300 dots per inch (dpi). Since many ink jet devices are inherently binary in nature (a dot is either deposited, or it is not), halftoning techniques such as error diffusion and ordered dither are generally used to create the appearance of digitized continuous tone images. Although images of moderate quality can be created in this manner, they generally fall noticeably short of "photographic quality."

There are a number of ways to increase the image quality obtained from an ink jet printer. One method is to increase the number of pixels per inch that can be generated by the printer. For example, ink jet printers have been recently introduced that print images at 600 dpi or even more.

Another method to increase the image quality for an ink jet printer is to increase the number of effective density levels that can be printed for any given pixel. One way that this can be done is by varying the size of the dots that are deposited on the substrate. Some ink jet technologies allow the size of the ink drop to be adjusted continuously throughout some range. Other technologies can produce a small number of discrete dot sizes. In this case, multilevel halftoning techniques are typically used to produce the appearance of a digitized continuous tone image. For example, a printer recently introduced by Hewlett-Packard (the HP 850) produces dots of three different dot sizes on a 300 dpi grid.

Other types of printers vary the effective density level for a pixel by adjusting the amount of colorant deposited on the substrate. Thermal dye transfer printers are one such class of devices. In this case, the density for a given pixel is controlled by the amount of heat applied to a dye donor ribbon. For an ink jet printer, continuously varying the ink colorant concentration is not a practical means for adjusting the effective density level. However, the use of a small number of different inks has been shown to produce desirable benefits. Canon has disclosed several ink jet printer arrangements that use a number of inks having different colorant concentrations where, additionally, the dot sizes can be varied continuously throughout some range (for example, see U.S. Pat. Nos. 4,560,997 and 4,959,659). In these arrangements, the primary control of the density is accomplished using the dot size variation, and the multiple ink colorant concentrations are used to extend the available density range.

These prior art arrangements disclosed have no provision for creating images on a printer that is capable of producing a small number of discrete dot sizes for a set of inks varying in colorant level. This problem is significantly more complex due to the fact that the density can not be controlled by continuously varying either the dot area or the colorant concentration.

SUMMARY OF THE INVENTION

It is an object of the present invention to create images by a printer which is capable of producing a small number of discrete dot sizes for a set of inks varying in colorant level.

This object is achieved by a method for processing a digitized continuous tone image so that such processed image is adapted to be applied to an image rendering device which prints dots from a set of one or more possible dot-areas and from a set of colorants having different colorant concentrations comprising the steps of:

a) selecting a set of N dot-area and colorant concentration combinations, each of said combinations producing a different integrated optical density value; and b) multilevel halftone processing the digitized continuous tone image to produce an output image wherein one member of the set of N dot-area and colorant concentration combinations is associated with each of the possible output levels.

This object is also achieved by apparatus for producing an image from a digitized continuous tone image such that the produced image includes dots printed from a set of two or more possible dot-areas and from a set of colorants having different colorant concentrations comprising:

a) an image rendering device including a plurality of colorants and being adapted to produce colorant dots from a set of one or more possible dot-areas;

b) means for multilevel halftone processing the digitized continuous tone image to produce an output image having a set of output levels;

c) means for selecting a dot-area and colorant combination, for each possible output level in the output image; wherein the selected combination for each of the output levels produces a different integrated optical density value; and d) means responsive to the selecting means for causing the image rendering device to produce an image including dots printed from a set of two or more possible dot-areas and from a set of colorants having different colorant concentrations.

Advantages

The present invention has the advantage that digitized continuous tone input images can be printed on a device that is only capable of printing a small number of discrete dot sizes for a set of inks varying in colorant level. The resulting images can be very close to that which can be produced with a printer capable of producing continuous tone output.

It has the additional advantage that the resulting continuous tone image can be made to be robust to process variations in the printing system.

BRIEF DESCRIPTION OF THE DRAWINGS

FIG. 2 is a block diagram of apparatus in accordance with the present invention;

FIG. 3 is a block diagram similar to FIG. 2 but showing apparatus including a multilevel dither halftoning arrangement;

DETAILED DESCRIPTION OF THE INVENTION

In the present invention, a method and apparatus for producing images on an image rendering device capable of printing dots using a set of colorants having different colorant concentrations is described. In a preferred embodiment of this invention, the image rendering device is an ink jet printer adapted to print a plurality of dot sizes using a set of gray inks, or alternatively sets of colored inks. However, it will be obvious to one skilled in the art that this method and apparatus can be applied to other types of image rendering devices as well.

Figure 1:
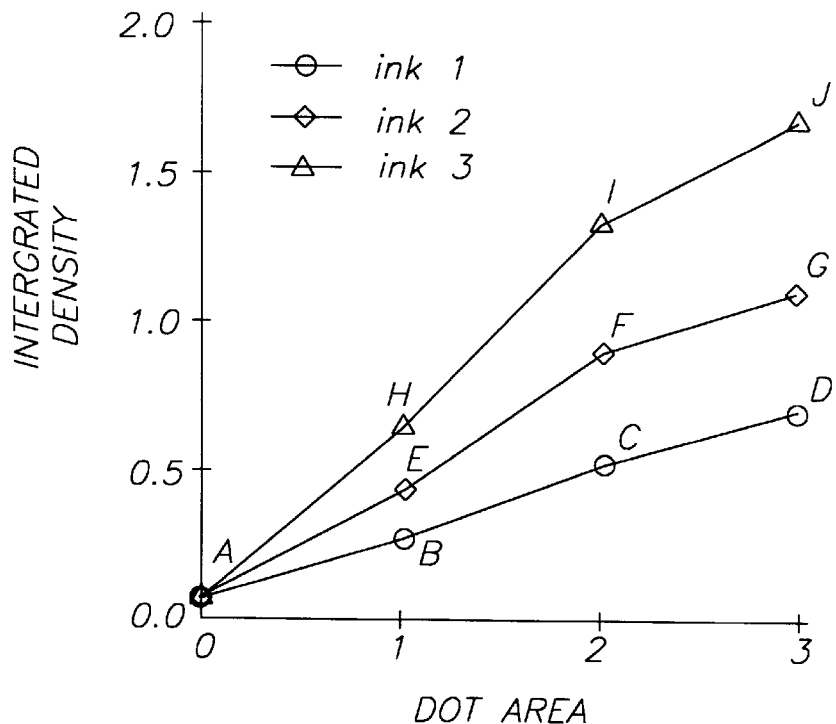
FIG. 1 is a plot illustrating typical integrated density values for specific dot-area and ink combinations.

For illustrative purposes, consider a monochrome ink jet printer that uses three different gray inks having different colorant concentrations, where each of the inks can be deposited on the substrate using one of three different dot-areas. The dot-areas may be varied by adjusting the drop volume, or alternatively by applying multiple drops to the same location on the substrate. FIG. 1 illustrates typical integrated density values that are obtained for full coverage of a specific dot-area/ink combination. The horizontal axis indicates which of the three available dot-areas is used. The different curves show the integrated density values that can be obtained using each of the inks. It can be seen that it is possible to create 10 different integrated density levels by using different dot-area/ink combinations. In this example, increasing integrated density values can be obtained by sequentially using the dot-area/ink combinations labeled A-B-E-C-D-H-F-G-I-J.

In many cases, it is not necessarily desirable to use all 10 of these different integrated density levels to produce images with the ink jet printer. For example, the points labeled D and H both have integrated density levels that are very close together. There would therefore be little benefit to using both of these dot-area/ink combinations. For a particular application, a subset of the available dot-area/ink combinations can be used. When the combinations in the subset are arranged in order of increasing density this will define a path through the space of all dot-area/ink combinations. For example, one possible path would be to first increase the dot-area for the ink with the lowest colorant concentration, and once the maximum dot-area is reached to then sequence through the available inks. This path would correspond to the sequence of points A-B-C-D-G-J on FIG. 1. This particular path uses only 6 of the 10 available dot-area/ink combinations. The dot-area values for each ink for these 6 combinations are shown in Table 1.

TABLE 1

| combination # | graph label | dot-area for ink 1 | dot-area for ink 2 | dot-area for ink 3 |
|---|---|---|---|---|
| 0 | A | 0 | 0 | 0 |
| 1 | B | 1 | 0 | 0 |
| 2 | C | 2 | 0 | 0 |
| 3 | D | 3 | 0 | 0 |
| 4 | E | 0 | 3 | 0 |
| 5 | F | 0 | 0 | 3 |

In many cases, it is possible to print dots for each of the available inks on top of each other. This greatly increases the number of available dot-area/ink combinations. For example, for the case where 3 different dot-areas can be used (plus a fourth state where no dot is printed) for each of 3 different inks there will be 4×4×4=64 different dot-area/ink combinations available. Since many of these combinations will produce similar integrated density values, only a subset of these combinations needs to be used for most applications.

One important factor in choosing a path through the set of all possible dot-area/ink combinations is robustness to process variations. For example, consider the case where the lightest ink with the intermediate dot-area is used to produce a particular integrated density value, a darker ink with the smallest dot-area is used to produce a slightly darker integrated density, and the lightest ink with the largest dot-area is used to produce an integrated density value that is slightly darker again. If a particular ink jet head used for the darker ink were to produce dots that were slightly larger than expected, it would be quite possible that the resulting integrated density could be even darker than the largest dot-area/lightest ink combination. This could result in reversals in the tonescale which would be quite undesirable. As a result, it is important to choose dot-area/ink combinations that are unlikely to produce objectionable artifacts given the expected amount of process variation. The path shown in Table 2 represents a sequence of 10 dot-area/ink combinations that are relatively insensitive to process variations. In this case, the integrated density is first increased by increasing the dot-area for the ink 1 until its maximum value is reached. To make higher integrated density values ink 1 is left at its maximum dot-area, and ink 2 is added in increasing dot-area. Likewise, to make even higher integrated density values, ink 1 and 2 are left at their maximum dot-areas, and ink 3 is added in increasing dot-area. With this arrangement, once an ink has been added it is never taken away. This will ensure that the integrated density value increases monotonically even in the presence of process variations.

TABLE 2

| combination # | dot-area for ink 1 | dot-area for ink 2 | dot-area for ink 3 |
|---|---|---|---|
| 0 | 0 | 0 | 0 |
| 1 | 1 | 0 | 0 |
| 2 | 2 | 0 | 0 |
| 3 | 3 | 0 | 0 |
| 4 | 3 | 1 | 0 |
| 5 | 3 | 2 | 0 |
| 6 | 3 | 3 | 0 |
| 7 | 3 | 3 | 1 |
| 8 | 3 | 3 | 2 |
| 9 | 3 | 3 | 3 |

Other sequences of dot-area/ink combinations that can be used are shown in Table 3 and Table 4. Although these sequences may be slightly more susceptible to process variations, they have the advantage that they utilize a larger number of dot-area/ink combinations. As a result, this will increase the available number of integrated density values that can be used, and consequently may result in smoother tonescale transitions.

TABLE 3

| combination # | dot-area for ink 1 | dot-area for ink 2 | dot-area for ink 3 |
|---|---|---|---|
| 0 | 0 | 0 | 0 |
| 1 | 1 | 0 | 0 |
| 2 | 2 | 0 | 0 |

TABLE 3-continued

| combination # | dot-area for ink 1 | dot-area for ink 2 | dot-area for ink 3 |
|---|---|---|---|
| 3 | 3 | 0 | 0 |
| 4 | 0 | 3 | 0 |
| 5 | 0 | 0 | 3 |
| 6 | 1 | 0 | 3 |
| 7 | 2 | 0 | 3 |
| 8 | 3 | 0 | 3 |
| 9 | 3 | 1 | 3 |
| 10 | 3 | 2 | 3 |
| 11 | 3 | 3 | 3 |

TABLE 4

| combination # | dot-area for ink 1 | dot-area for ink 2 | dot-area for ink 3 |
|---|---|---|---|
| 0 | 0 | 0 | 0 |
| 1 | 1 | 0 | 0 |
| 2 | 2 | 0 | 0 |
| 3 | 3 | 0 | 0 |
| 4 | 0 | 3 | 0 |
| 5 | 1 | 3 | 0 |
| 6 | 2 | 3 | 0 |
| 7 | 3 | 3 | 0 |
| 8 | 0 | 0 | 3 |
| 9 | 1 | 0 | 3 |
| 10 | 2 | 0 | 3 |
| 11 | 3 | 0 | 3 |
| 12 | 0 | 3 | 3 |
| 13 | 1 | 3 | 3 |
| 14 | 2 | 3 | 3 |
| 15 | 3 | 3 | 3 |

The actual colorant concentrations used for the inks, as well as the dot-areas that are used are also important parameters. To minimize contouring as well as the visibility of any halftoning artifacts, it is desirable that the dot-area/ink combinations in the sequence produce integrated density values that are approximately equally spaced in perceived lightness. For example, relative to the sequence given in Table 2, the ink colorant concentrations can be chosen so that combination numbers 0,3,6, and 9 are approximately equally spaced in perceived lightness. Further, if the dot-areas can be adjusted, they can be chosen so as to equally space the perceived lightness within each of the sub-sections of the sequence.

In some cases, it may be desirable to require that the colorant concentrations for the inks are all identical so that only a single ink formulation is needed. Likewise, it may be desirable to require that the available dot sizes for each of the inks are equivalent to simplify the printing apparatus. However, in general, there is no requirement that the dot-areas and/or colorant concentrations used for each ink be the same. Furthermore, the number of dot-areas used for each ink can also be different. When the method of this invention is applied to a color image rendering device, the number of inks, as well as the number of dot-areas, the actual dot-areas and the colorant concentrations can all be different for each of the color channels. In general, fewer inks can be used for the yellow channel in a color image rendering device due to the fact that human observers are less sensitive to artifacts and noise in this color channel.

Once the sequence of dot-area/ink combinations has been selected, it is necessary to process the digital image to determine which of the available combinations will be printed for each pixel of the image. Turning now to FIG. 2 a digitized continuous tone input image 10 is to be printed on an image rendering device, such as an ink jet printer, that uses a set of N inks having various colorant concentrations. For printing black-and-white images, the inks will generally be gray inks which may range from light gray to black. The input image 10 consists of a set of input pixels having input pixel values I(x,y) where x and y are the column and row addresses of the pixel. Typically input pixel values will be given by integers in the range of 0 to 255.

Each input pixel value has associated with it an aim density value which specifies an optical density value to be produced for an output image. For example, an input pixel value of 255 may correspond to an aim density value of 0.05, and an input pixel value of 0 may correspond to an aim density value of 2.30. The relationship between the input pixel values and the aim density values specifies an aim tone reproduction curve. In an uncalibrated state, the ink jet digitized continuous tone will generally not respond according to the aim tone reproduction curve. Consequently a calibration look-up table (LUT) 12 can be used to map the input pixel values I(x,y) to calibrated input pixel values $I_c(x,y)$. The calibration LUT is generally determined by first measuring a device raw sensitometry curve that relates the actual density values to the input pixel values when no calibration LUT is applied. The device raw sensitometry curve can then be used to determine the calibrated input pixel value that will produce the desired aim density value for each of the allowable input pixel values. The resulting function specifying the relationship between the calibrated input pixel values and the input pixel values can then be stored in a calibration LUT that can be addressed by the input pixel values of an input image.

It should be noted that, in some cases, it may not be necessary to apply the a calibration LUT, or it may be desirable to implement the calibration step in some other way. For example, a calibration step can be used to modify the input image before it is processed using the present invention. In these cases, the step of applying the calibration LUT 12 can be skipped.

The next step is to apply a multilevel halftoning process 14 to convert the calibrated input pixel values into multi-toned pixel values M(x,y). The multilevel halftoning process takes the digitized continuous tone input values (typically represented as integers in a range 0–255), and produces multitoned pixel values in the range 0 to L−1, where L is the number of possible multitoned pixel values. The number of possible multitoned pixel values generally corresponds to the number of dot-area/ink combinations in the sequence of combinations selected above. A variety of multilevel halftoning algorithms are well known in the art such as multi-level ordered dither, and multilevel error diffusion. (For example see: R. S. Gentile, E. Walowit and J. P. Allebach, "Quantization and multilevel halftoning of color images for near original image quality," J. Opt. Soc. Am. A 7, 1019–1026 (1990).) Any of these methods, or others that are developed in the future can be used for the method of the present invention.

Once the multitoned pixel values M(x,y) have been determined, it is necessary to determine the corresponding dot-areas for each of the inks. In one preferred embodiment of this invention this is accomplished using a set of dot-area LUTs 16-1 through 16-N. One dot-area LUT is provided for each of the N inks. The dot-area LUTs store a value indicating which of the available dot-areas should be used for each of the L possible multitoned pixel values. Examples of these LUTs are shown in Tables 1, 2, 3 and 4. The column labeled "combination #" represents the index into the LUT corresponding the multitoned pixel value. The columns labeled "dot-area for ink #" are the values that would be stored in the LUT. For example, the values in the "dot-area for ink 1" column would be stored in dot-area $\text{LUT}_1$ 16-1, etc.

The output of the dot-area LUTs are the output pixel values $O_1(x,y)$ to $O_N(X,Y)$. These output pixel values indicate the dot-area that should be used for each of the inks for the pixel at location x, y. For the special case of a binary image rendering device that can only print one dot-area, the output pixel values will either be "on" or "off". More generally, the output pixel values can take on different values corresponding to the number of possible dot-areas for each ink. The collection of all of the output pixel values for each of the inks constitutes a set of output images 18-1 through 18-N. In practice, the output images in their entirety may be stored in a set of frame buffers. Alternatively, only a small number of pixels and/or lines can be temporarily stored until the image rendering device is ready to print the corresponding portion of the image.

Finally, the set of output images 18-1 through 18-N are printed on the image rendering device 19. Each output image in the set of output images will be printed using the corresponding ink. The output pixel values for each output image determine the dot area to be printed for each pixel location.

Turning now to FIG. 3, an embodiment of the present invention using a multi-level dither halftoning arrangement is shown. A digitized continuous tone input image 20 is to be printed on an image rendering device 29 that uses a set of N inks having various colorant concentrations. An optional calibration LUT 21 is used to process the input pixel values I(x,y) to determine calibrated input pixel values $I_c(x,y)$. The column and row address of the input pixel are given by x and y, respectively. Modulo operators 22 are used to produce column and row indices $x_d$ and $y_d$ that are used to address a dither matrix 23 to determine an addressed dither value $d(x_d, y_d)$.

The dither matrix consists of an array of dither values having column and row dimensions $M_x$ and $M_y$, respectively. The dither values stored in the dither matrix can correspond to many different types of dither patterns. For example, well-known clustered-dot dither patterns, or Bayer dither patterns can be used. Preferably, dither patterns that have minimum visibility to a human observer can be used, such as those described by Sullivan et al. in U.S. Pat. No. 5,214,517, and by Spaulding et al. in U.S. patent application Ser. No. 08/131,801, the disclosures of which are incorporated by reference herein.

The addressed dither value is next combined with the calibrated input pixel value using an adder 24 to produce a modified pixel value. The modified pixel value is then processed using a quantizer 25 to produce a multitoned pixel value M(x,y). The multitoned pixel value is next used to address a set of dot-area LUTs 26-1 through 26-N to determine output pixel values $O_1(x,y)$ to $O_N(X,Y)$ for each of the N inks. The collection of all of the output pixel values for each of the inks comprise a set of output images 28-1 through 28-N that can be printed on the image rendering device 29.

It should be noted that the multilevel ordered dither arrangement shown in FIG. 3 is just one of many possible arrangements for performing multilevel ordered dither. It will be obvious to one skilled in the art that other approaches, such as the one described by Miller et al. in U.S. Pat. No. 5,291,311, can easily be adapted for use in the present invention.

Figure 4:
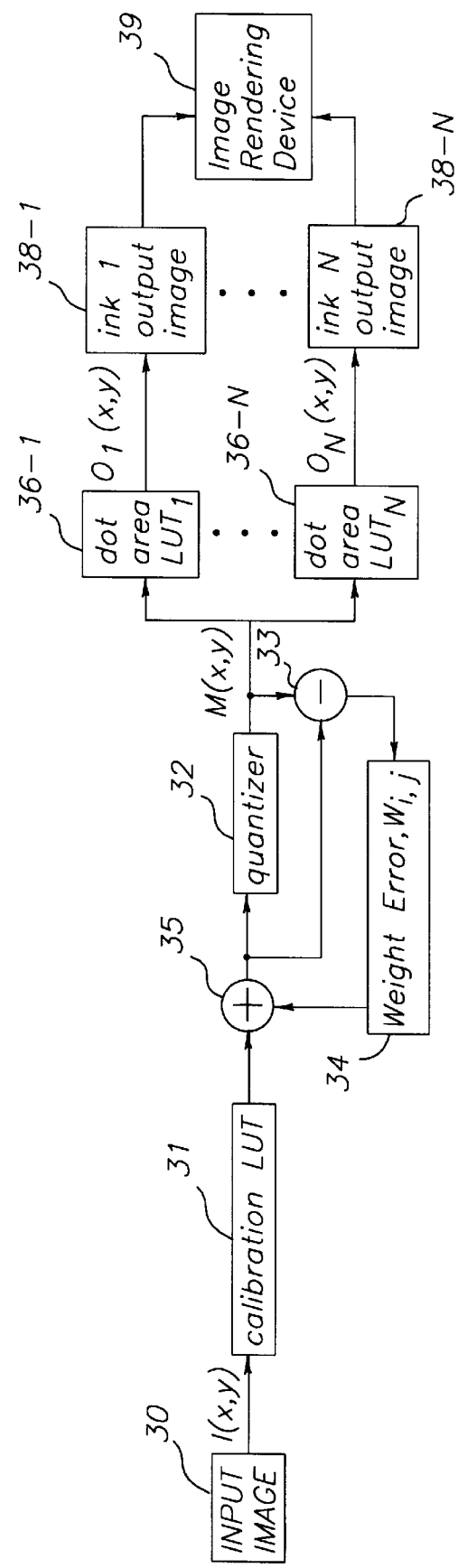
FIG. 4 is another block diagram similar to FIG. 2 but showing apparatus including a multilevel error diffusion halftoning arrangement.

Another preferred embodiment of the present invention is shown in FIG. 4. In this case, a multilevel error diffusion arrangement is used. A digitized continuous tone input image 30 is to be printed on an image rendering device 39 that uses a set of N inks having various colorant concentrations. An optional calibration LUT 31 is used to process the input pixel values I(x,y) to determine calibrated input pixel values $I_c(x,y)$. The calibrated input value for the current input pixel is processed using a quantizer 32 to form a multitoned pixel value M(x,y). A difference signal generator 33 computes the difference between the calibrated input pixel value and the multitoned pixel value, representing the error introduced by the quantization process. In some cases, it may be necessary to scale either the input pixel value of the multitoned pixel value before computing the difference signal in order to compute the proper value. The difference signal is next multiplied by a series of error weights using a weighted error generator 34. The resulting weighted difference signals are provided to an adder 35 which adds the weighted difference signals to the calibrated input values of nearby pixels that have yet to be processed to form modified calibrated input values. The propagation of the errors made during the quantization process to the nearby pixels ensures that the mean of the pixel values is preserved over a local image region.

The multitoned pixel value M(x,y) is next used to address a set of dot-area LUTs 36-1 through 36-N to determine output pixel values $O_1(x,y)$ to $O_N(X,Y)$ for each of the N inks. The collection of all of the output pixel values for each of the inks comprise a set of output images 28-1 through 28-N that can be printed on the image rendering device 39.

Figure 5:
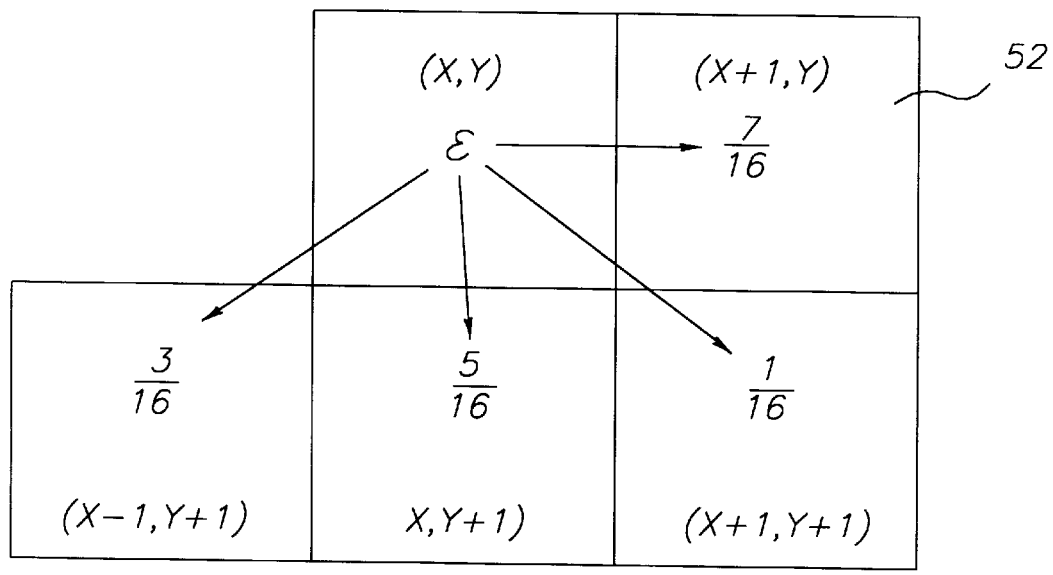
FIG. 5 illustrates a typical set of error weights for use with the arrangement of FIG. 4.

FIG. 5 illustrates a typical set of error weights that can be used to distribute the errors to the nearby pixels. The difference signal for a pixel at location (x,y) is represented by $\epsilon$. The error weight 52 for the next pixel to the right at location (x+1, y) is given as 7/16. Likewise, the error weights for the other nearby pixels are also shown. This particular set of coefficients is widely known as the Floyd-Steinberg coefficients.

It should be noted that the multilevel error diffusion process shown in FIG. 3 is just one of many possible arrangements for performing multilevel error diffusion. It will be obvious to one skilled in the art that other approaches, such as the ones described by Sullivan in U.S. Pat. No. 5,051,844, and Spaulding et al. in U.S. patent application Ser. No. 08/399/670, can easily be adapted for use in the present invention.

The present invention can be applied to produce monochrome output images using a set of gray inks having different colorant concentrations. For color image rendering devices, this method can be applied to one or more of the color channels. For example, an image rendering device that uses cyan, magenta, and yellow colorants (CMY) with 3 different allowable dot-areas for each of 3 different cyan inks, 3 different magenta inks, and 3 different yellow inks can be used. In this case, the process shown in FIG. 2 can be replicated for each of the color channels. In certain cases, it may be desirable to only apply the method of the current invention to a subset of the color channels. For example, it may be desirable to use only one ink for the yellow color channel since artifacts and halftone patterns in this color channel will generally be less visible to a human observer.

The invention has been described in detail with particular reference to certain preferred embodiments thereof, but it will be understood that variations and modifications can be effected within the spirit and scope of the invention.

Parts list 10 input image
12 calibration look-up table
14 multilevel halftoning process
16 dot-area look-up tables
18 output images
19 image rendering device
20 input image
21 calibration look-up table
22 modulo operators
23 dither matrix
24 adder
25 quantizer
26 dot-area look-up tables
28 output images
29 image rendering device
30 input image
31 calibration look-up table
32 quantizer
33 difference signal generator
34 weighted error generator
35 adder
36 dot-area look-up tables
38 output images
39 image rendering device
52 error weight we claim:

1. A method for processing a digitized continuous tone image having a set of K input values so that such processed image is adapted to be applied to an image rendering device which prints dots from a discrete set of two or more possible dot-areas and from a discrete set of colorants having different colorant concentrations comprising the steps of:
 a) selecting a discrete set of L dot-area and colorant concentration combinations, each of said combinations producing a different integrated optical density value, wherein the number of dot-area and colorant combinations L is less than the number of input values K;
 b) multilevel halftone processing the digitized continuous tone image to produce an output image having a discrete set of L output levels which will create the appearance of intermediate density levels; and
 c) mapping each of the L output level to one member of the discrete set of L dot-area and colorant concentration combinations.

2. The method of claim 1 further including:
 c) printing the multilevel output image on the image rendering device using the associated member of the set of L dot-area and colorant concentration combinations for each pixel location.

3. The method of claim 1 further including:
 c) addressing a set of dot-area look-up tables with the multitoned pixel values to select one of the possible dot-areas for each of the set of colorants.

4. The method of claim 1 wherein the set of colorants is a set of gray colorants.

5. A method for processing a digitized continuous tone color image having a plurality of color channels wherein the method of claim 1 is applied to at least one of the color channels.

6. The method of claim 1 wherein the multilevel halftone processing includes a multilevel error diffusion process.

7. The method of claim 1 wherein the multilevel halftone processing includes a multilevel dither process.

8. The method of claim 7 wherein the multilevel dither process includes the step of producing minimum visibility halftone patterns.

9. The method of claim 1 further including the step of modifying the digitized continuous tone image by a calibration look-up table to compensate for device response characteristics.

10. The method of claim 1 wherein the rendering device is adapted to print two or more dot areas for at least three colorants having different colorant concentrations.

11. The method of claim 1 wherein the set of L dot-area and colorant concentration combinations is selected by:
 (i) increasing the dot-area for a first colorant until its maximum dot-area is reached to produce increasing integrated density values;
 (ii) leaving the previous colorants at their maximum dot-areas and increasing the dot-area for a next colorant until its maximum dot-area is reached to produce even higher integrated density values; and
 (iii) repeating step (ii) for each colorant.

12. The method of claim 1 wherein the set of L dot-area and colorant concentration combinations is selected by:
 (i) increasing the dot-area for a first colorant until its maximum dot-area is reached; and
 (ii) leaving the first colorant at its maximum dot-area and increasing the dot-area for a second colorant until its maximum dot-area is reached.

13. The method of claim 12 further including:
 (iii) leaving the first and second colorants at their maximum dot-areas and increasing the dot-area for a third colorant until its maximum dot-area is reached.

14. The method of claim 1 wherein the image rendering device is an ink jet printer.

15. Apparatus for producing an image from a digitized continuous tone image having a set of K input values such that the produced image includes dots printed from a discrete set of two or more possible dot-areas and from a discrete set of colorants having different colorant concentrations comprising:
 a) an image rendering device including a plurality of colorants and being adapted to produce colorant dots from a discrete set of one or more possible dot-areas;
 b) means for multilevel halftone processing the digitized continuous tone image to produce an output image having the discrete set of L output levels which will create the appearance of intermediate density levels wherein the number of dot-area and colorant combinations L is less than the number of input values K;
 c) means for selecting a dot-area and colorant combination, for each of the L possible output level in the output image; wherein the selected combination for each of the L output levels produces a different integrated optical density value; and
 (d) means responsive to the selecting means for causing the image rendering device to produce an image including dots printed from the discrete set of two or more possible dot-areas and from the discrete set of colorants having different colorant concentrations.

16. The apparatus of claim 15 wherein the image rendering device is an ink jet printer.

17. The apparatus of claim 15 wherein the selecting means includes a set of dot-area look-up tables addressed by the output levels of the output image.

18. The apparatus of claim 17 wherein a dot-area look-up table is provided for each colorant of the colorant set.

19. The apparatus of claim 15 wherein the set of colorants is a set of gray colorants.

20. The invention of claim 15 wherein the digitized continuous tone image is a color image having a plurality of color channels and wherein the multilevel halftone means processes at least one color channel.

21. The apparatus of claim 15 wherein the multilevel halftone processing means includes a multilevel error diffusion process.

22. The apparatus of claim 15 wherein the multilevel halftone processing means includes a multilevel dither process.

23. The apparatus of claim 22 wherein the multilevel dither processing means for producing minimum visibility halftone patterns.

24. The apparatus of claim 15 further including a calibration look-up table and means for applying the digitized continuous tone image to the calibration look-up table which compensates for the image rendering device response characteristics.

25. The apparatus of claim 15 wherein the rendering device is adapted to print two or more dot areas for at least three colorants having different coloring concentrations.

* * * * *